March 7, 1967   M. R. HUTCHISON, JR., ETAL   3,307,462
AUTOMATIC FLASH CONTROL DEVICE FOR PHOTOGRAPHIC CAMERAS
Original Filed Aug. 6, 1962   3 Sheets-Sheet 1

Miller R. Hutchison, Jr.
Samuel S. Merz
INVENTORS
BY R. Frank Smith
Robert W. Hampton
ATTORNEYS March 7, 1967
M. R. HUTCHISON, JR., ET AL
3,307,462
AUTOMATIC FLASH CONTROL DEVICE FOR PHOTOGRAPHIC CAMERAS
Original Filed Aug. 6, 1962
3 Sheets-Sheet 2
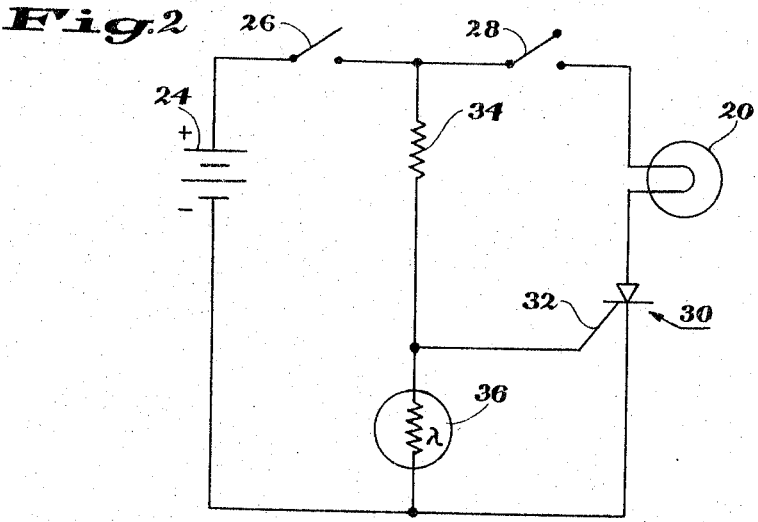
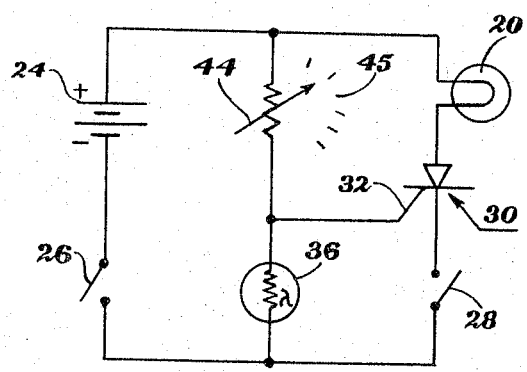
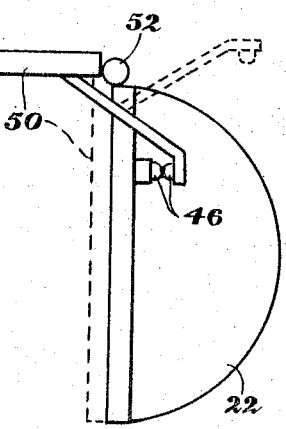
Miller R. Hutchison, Jr.
Samuel S. Merz
INVENTORS
BY R. Frank Smith
Robert W. Hampton
ATTORNEYS March 7, 1967    M. R. HUTCHISON, JR., ET AL    3,307,462
AUTOMATIC FLASH CONTROL DEVICE FOR PHOTOGRAPHIC CAMERAS
Original Filed Aug. 6, 1962    3 Sheets-Sheet 3

Miller R. Hutchison, Jr.
Samuel S. Merz

INVENTORS

BY R. Frank Smith
Robert W. Hampton
ATTORNEYS

United States Patent Office 3,307,462
Patented Mar. 7, 1967

3,307,462
AUTOMATIC FLASH CONTROL DEVICE FOR PHOTOGRAPHIC CAMERAS
Miller R. Hutchison, Jr., and Samuel S. Merz, Rochester, N.Y., assignors to Eastman Kodak Company, Rochester, N.Y., a corporation of New Jersey
Continuation of application Ser. No. 215,044, Aug. 6, 1962. This application Jan. 22, 1965, Ser. No. 427,290
Claims priority, application Great Britain, June 14, 1962, 22,844/62
14 Claims. (Cl. 95—11)

The present invention relates to photographic cameras and more particularly concerns automatic flash control systems for such cameras. This application is a continuation application of U.S. application Serial No. 215,044, filed August 6, 1962 and now abandoned.

In cameras it has long been customary to employ photoflash lamps, timed with the camera shutters, to illuminate photographic subjects when scene brightness is low. The use of such photoflash lamps has given rise to several problems, the primary one being that the camera operator has had to make some determination of the necessity for flash operation.

With the advent of photoelectrically controlled exposure systems, it became a common practice to provide a camera with a viewfinder signal to indicate visually when the subject illumination is too low for normal photography and that flash operation is required for proper exposure. Nevertheless the problems of flash operation were still not ended. When the camera operator aims the camera he naturally wants to take a picture at that time. When he is apprised even by an automatic signal that flash operation is required, he must make any necessary adjustments of the camera for flash operation, e.g., coupling the diaphragm adjustment to the focus adjustment, manually setting the diaphragm and shutter, and of course inserting a flashlamp into the camera. By the time such adjustments have been made, and assuming that the photographer has the necessary flashlamp within convenient access, quite often the subject brightness has changed or the event to be recorded has transpired. It is then prudent for the photographer to remove the flashlamp from the camera unless he intends the next picture to be taken under flash conditions.

The above operation is entirely unsatisfactory and tends to discourage photography. It leads to waste of film when the photographer either forgets to insert a flashlamp or tries, without one, to photograph a relatively dark, transient event. It leads to waste of flashlamps, and possible overexposure of a subsequent picture when the photographer forgets to remove an unused flashlamp from the camera after an unsuccessful attempt to readjust the camera for flash operation before an event has transpired.

It is therefore a primary object of the present invention to control the operation of a flash bulb in a camera automatically, without any attention by or knowledge of the camera operator, such that flash operation will occur when scene brightness is at a low enough level to require it, but will not occur otherwise.

A further object of the invention is to permit a flashlamp to be carried in a camera socket at all times and automatically to prevent its ignition except during low levels of field brightness.

Another object of the invention is to control the flash operation of a camera photoelectrically.

A further object of the invention is to substitute a relatively inexpensive and rugged device for an exposure meter and thereby to increase the general usefulness of photography.

A related object of the invention is to prevent overheating of a solid state switch employed in an automatic flash control circuit. Such switches are susceptible to damage from overheating and, in recognition of this fact, are rated by their manufacturers for both continuous and peak currents. Switches having relatively high current ratings are generally more expensive than those having relatively low current ratings. In the present invention the use of a relatively inexpensive solid state switch is permitted by employing the flash lamp to fuse the switch circuit. Normal rupture of the lamp filament limits the duration of the current pulse through the switch.

Other objects of the invention will appear from the following description, reference being made to the accompanying drawings, wherein:

FIG. 2 is a schematic wiring diagram of a first embodiment of the invention;

FIG. 3 is a schematic wiring diagram of a second embodiment of the invention;

FIG. 4 is a partial side view of the flash reflector and cover as employed for controlling the line switch of the flash circuit in accordance with a further embodiment of the invention.

Figure 1:
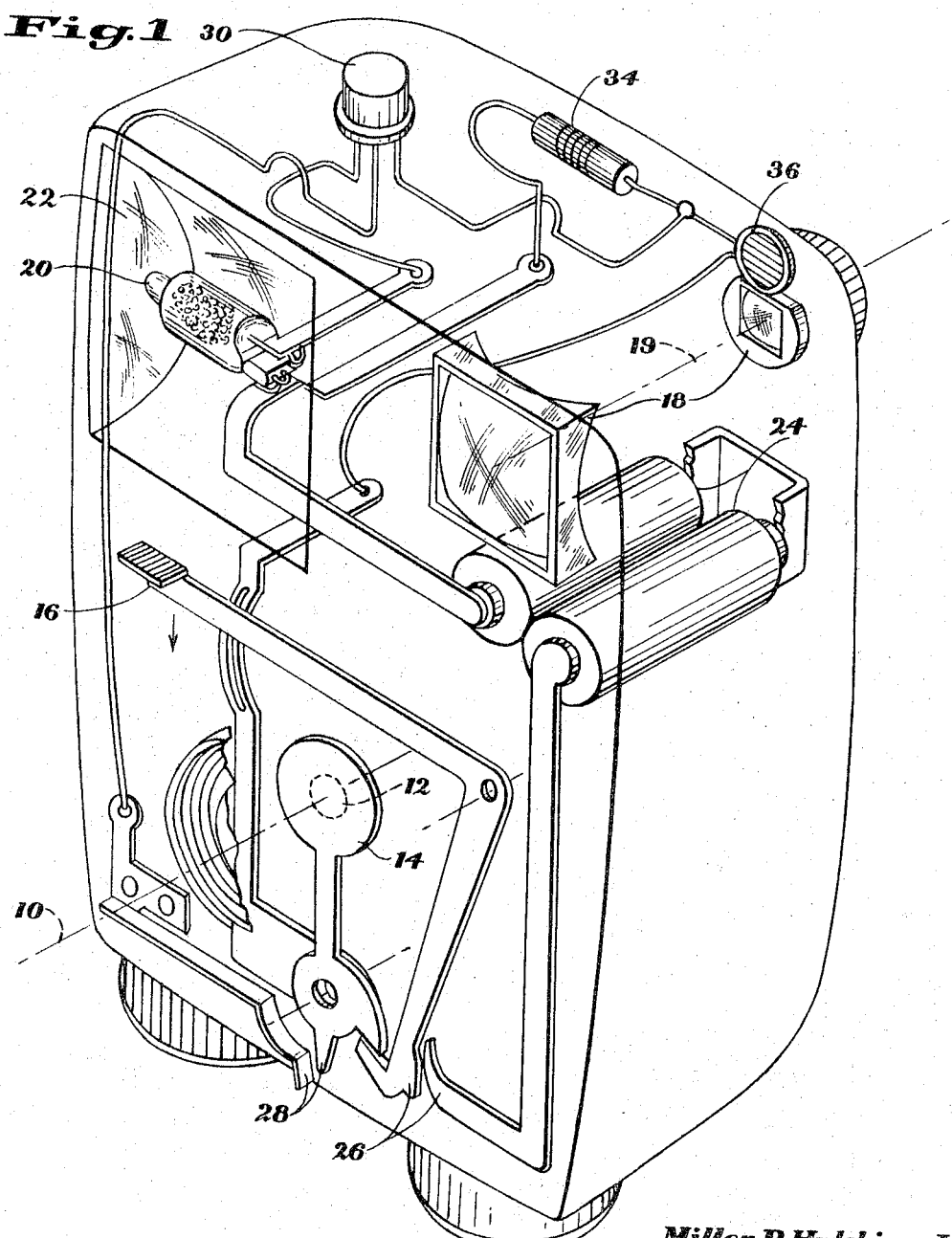
FIG. 1 is a partial perspective view of a camera showing the elements of the present invention and the camera elements cooperating therewith.

Referring to FIGS. 1 and 2, a camera embodying the present invention has an optical axis 10 on which are located the usual exposure aperture 12 and shutter blade 14. A camera actuating member 16 operates the shutter in a well known manner. A viewfinder 18 may be located on a second optical axis 19.

A flash bulb 20 is mounted in front of a reflector 22. The flash bulb is in series circuit with a battery 24 and with a normally open line switch 26 that prevents the battery from being discharged when the camera is not in use. The usual shutter timing switch 28 also is in series circuit with the flash bulb, as is a gated switch 30, illustrated as a silicon controlled rectifier having a control element or gating input 32. A potential divider is connected in circuit parallel with the flash bulb 20, switch 30 and switch 28 and comprises a resistor 34 and a light dependent resistor 36 such as a cadmium sulfide cell. The light dependent resistor or cell 36 is disposed for illumination by scene light and for convenience may be located in the viewfinder as illustrated in FIG. 1. The junction of resistors 34 and 36 is connected to the control element 32 of switch 30. Battery 24 is in the circuit with such polarity that its negative terminal is connected to the terminal of cell 36 opposite resistor 34.

When the camera actuating member 16 is moved in the direction shown by the arrow in FIG. 1, it first closes line switch 26 and then operates the shutter, which in turn closes the shutter synchronizing switch 28. If at this time the scene brightness is sufficiently high, the resistance of cell 36 is relatively low, thereby maintaining the potential of control element 32 also at a relatively low value, which biases switch 30 to a non-conducting or "open" state. This prevents any substantial current from flowing through the flash bulb 20 and thereby properly prevents flash operation from occurring. On the other hand, if the scene brightness is sufficiently low, the resistance of cell 36 is relatively high, thereby maintaining the potential of gate 32 also at a relatively high value, which biases switch 30 to a conducting or "closed" state. This permits a sufficient current to flow through flash bulb 20 for igniting it and properly causes a flash operation.

From the foregoing it will be seen that the operation of the flash bulb is completely automatic and requires no attention from the camera operator, nor need the camera operator be aware of the conditions requiring flash operation.

The embodiment illustrated in FIG. 3 is similar to that of FIG. 2 except that in FIG. 3 the first or upper element of the voltage divider is a variable resistor 44, which may be adjusted for factory calibration of the system. It also may be adjusted in conjunction with a scale 45 of an appropriate exposure factor, to compensate the circuit for flash operation at various levels of scene brightness.

FIG. 4 illustrates the operation of the line switch 46, corresponding to switch 26 of FIGS. 1-3, by means of a cover 50 for the reflector 22, the cover being hinged to the reflector at 52. When the cover is open, as illustrated in solid lines in FIG. 4, switch 46 is closed. When the cover is closed, as illustrated in broken lines in FIG. 4, the switch is open. It will be seen that switch 46 therefore disables the automatic flash circuit when the reflector cover is closed. The camera operator may wish to disable this circuit for deliberate underexposure.

It will be obvious that the line switch can be arranged for simple manual operation instead of by automatic means as disclosed hereinabove. In such case the photographer merely opens the switch when he wants to disable the automatic flash control circuit.

Figure 5:
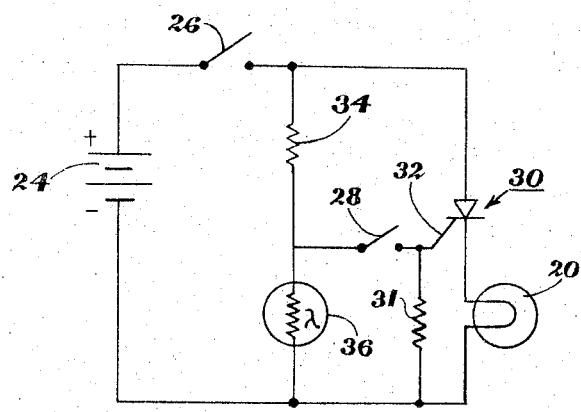
FIGS. 5 and 6 are schematic wiring diagrams of other embodiments of the invention.

FIG. 5 illustrates the location of the shutter synchronizing switch in the gate or control circuit of switch 30. This reduces the current through switch 28 to a small value relative to the embodiments of FIGS. 1-3 and permits use of low-pressure contacts in switch 28. Therefore, it eliminates the additional shutter retardation attributable to frictional resistance of the heavier synchronizing switch that normally would be required for carrying the heavier current. Further, it eliminates the resistance of the synchronizing switch in the lamp ignition circuit. Thus it improves the synchronization of the circuit and extends the useful life of the entire mechanism. In order to prevent ignition of lamp 20 when the line switch 26 is closed, even with synchronizing switch 28 open, the control element 32 is connected to the negative battery terminal by a bleeder resistor 31.

Figure 6:
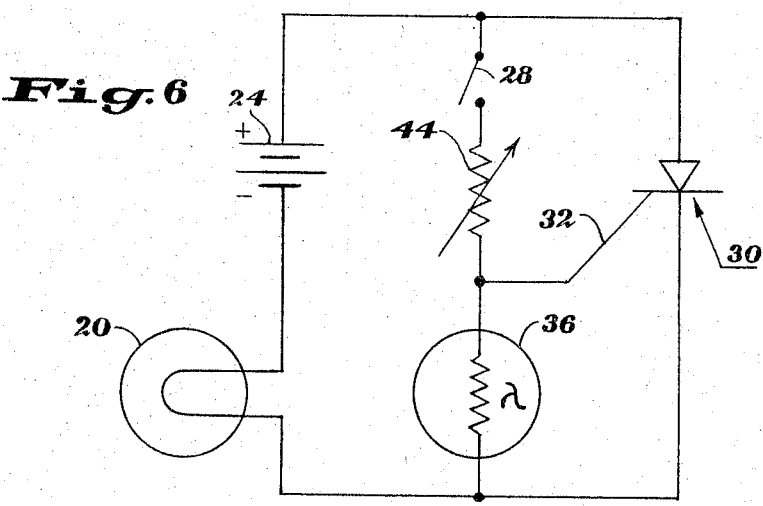

FIG. 6 illustrates a further embodiment of the invention, wherein the shutter synchronizing switch 28 is located in series with the voltage divider. This location stabilizes the action of switch 30 by preventing the accumulation of a static charge that might occur when the synchronizing switch is in the gate or control circuit of switch 30, as illustrated in FIG. 5, and therefore it eliminates the need for the bleeder resistor 31. This change also minimizes the possibility that transient voltages, due to the opening and closing of switch 28, might fire the lamp when scene brightness is above the level for flash operation.

It will be noted that the line switch may be eliminated from the embodiment illustrated in FIG. 6, it being unnecessary to prevent battery drain through the voltage divider, because of the presence of the normally open switch 28 in series with the voltage divider. Although there may be a small leakage current through lamp 20 and switch 30, proper choice of switch 30 limits the leakage current to an amount that is insufficient to affect circuit operation adversely. Inasmuch as there are no mechanical switches at all in the lamp-firing circuit of this embodiment, a higher voltage is applied to the lamp filament from a given battery, which enhances the reliability of the circuit, i.e., the certainty of lamp ignition under flash conditions.

The invention has been described in detail with particular reference to preferred embodiments thereof, but it will be understood that variations and modifications can be effected within the spirit and scope of the invention as described hereinabove and as defined in the appended claims. In particular, it will be understood that the "gated switch" that is connected in series with the flash lamp need not be of any particular type nor need it be strictly a two-state device, provided that it conducts current in insignificant amounts below its gated cut-off potential and in amounts sufficient to ignite the lamp above its gated cut-off potential. The gating or control element may be of any kind that is suited to this purpose.

We claim:

1. In a camera adapted to receive a flash lamp, the combination comprising: a series circuit including said lamp, a source of electrical potential, and gated switching means having a gating input and a normally open condition and a closed condition assumed in response to at least a predetermined potential applied to said gating input; a photocell illuminatable by field light and arranged in circuit with said source for regulating the potential of said gating input for enabling said switching means to assume its closed condition only when said photocell receives illumination below a predetermined level, whereby in normal operation of the camera, said flash lamp is ignitable by said source only when field brightness is relatively low, the photocell comprising a photoresistive device, with: a voltage divider connected in parallel with said switching means and including a resistor in series with said photoresistive device, said gating input being electrically connected to the junction of said resistor and said photoresistive device.

2. The combination defined in claim 1, with: a normally open shutter synchronizing switch connected in series with said voltage divider; a shutter; manually operable means for actuating said shutter; and means for closing said synchronizing switch in timed relation with actuation of said shutter.

3. The combination defined in claim 1, with a normally open synchronizing switch connected in series with said voltage divider; manually operable camera actuating means; and means for closing said synchronizing switch in response to operation of said camera actuating means.

4. The combination defined in claim 1, with a normally open synchronizing switch connecting said gating input and said junction; manually operable camera actuating means; and means for closing said synchronizing switch in response to operation of said camera actuating means.

5. The combination defined in claim 1, with a normally open synchronizing switch connected in series with said switching means; manually operable camera actuating means; and means for closing said synchronizing switch in response to operation of said camera actuating means.

6. The combination defined in claim 1, wherein said switching means is a solid-state device and said lamp constitutes a protective fuse for said switching means.

7. The combination according to claim 1 wherein the said resistor is variable and may be manually adjusted in cooperation with an exposure factor scale.

8. A flash lamp operating circuit for a camera having means adapted to receive a flash lamp and having a manually operable actuating member, said circuit comprising: a source of electrical potential having positive and negative terminals; a gated switch connected in series with said lamp-receiving means across the terminals of said source and having a gating input, said gated switch being adapted to conduct enough current from said source for igniting a flash lamp in said lamp-receiving means when at least a predetermined potential is applied to said gating input; a synchronizing switch connected in series with said gated switch and said lamp receiving means; a photoresistive device having a pair of terminals, a first of which is connected to the negative terminal of said source and the second of which is connected to the gating input of said gated switch; a resistor connected between the second terminal of said photoresistive device and the positive terminal of said source, said resistor and photoresistive device forming a potential divider to control the potential of said gating input as a function of the illumination of said photoresistive device; and means for closing said synchronizing switch in timed relation with the operation of said camera actuating member, whereupon a flash lamp in said lamp-receiving means is ignited through said gated switch if and only if said photoresistive device is illuminated at less than a predetermined level.

9. In a camera adapted to receive a flash lamp, an automatic flash lamp control circuit comprising in combination: a source of electrical energy, a switching device and means for receiving a flash lamp in series electrically with said electrical energy source, the switching device changeable between an open state preventing flash lamp firing and a closed state enabling flash lamp firing; a photoresistive device in parallel electrically with said switching device and responsive to field brightness by varying in resistance value in response thereto; switch control means electrically connected to said photoresistive device to directly control changing of the switching device between the open and closed states, the switch control means being responsive to electrical current flowing through the photoresistive device to change the switching device from a closed state to an open state whenever field brightness exceeds a predetermined value and from an open state to a closed state whenever field brightness is below the predetermined value; a normally open shutter synchronizing switch operable to prevent a flash lamp igniting current from flowing from said source through a flash lamp in said flash lamp receiving means; and means for closing said synchronizing switch in timed relation with shutter operation to permit a flash lamp firing current.

10. The combination defined in claim 9, wherein said switching means is a solid-state device electrically conductable in said closed state and said flash lamp receiving means together with a flash lamp constitutes a fuse means which upon flash lamp firing opens said series circuit.

11. The combination according to claim 9 wherein the switching device comprises a solid state switch and the switch control means comprises a gating input control element integral with said switch.

12. The combination according to claim 9 wherein the source of electrical energy includes positive and negative terminals; the switching device comprises a gated switch having a gating input and conducting enough current from said source for lighting a flash lamp in the receiving means when at least a predetermined potential is applied to said gating input; and the photoresistive device includes a pair of terminals, a first of which is connected to the negative terminal of said source and the second of which is connected to the gating input of said gated switch, the combination further comprising a resistor connected in series with the synchronizing switches between the second terminal of said photoresistive device and the positive terminal of said source, the resistor and photoresistive device forming a potential divider to control the potential of said gating input as a function of the variation in resistance value of said photoresistive device.

13. The combination according to claim 1 and further comprising a normally open line switch in series electrically with the source of electrical potential to maintain the circuit in an open condition between camera operations, and means to close the line switch before camera operation.

14. The combination according to claim 13 wherein the line switching means comprises a cover for the flash lamp receiving means, the cover including means to close the line switch upon movement of the cover to an open position uncovering the flash lamp receiving means and opening the line switch upon movement of the cover to a closed position covering the flash lamp receiving means.

References Cited by the Examiner
UNITED STATES PATENTS
2,750,453   6/1956   Pritchard _____ 179—171

JOHN M. HORAN, Primary Examiner.